United States Patent [19]

Dickens

[11] Patent Number: 4,589,672
[45] Date of Patent: May 20, 1986

[54] IMPROVEMENT IN OR RELATING TO TRAILERS

[75] Inventor: John R. Dickens, Chesham, England

[73] Assignee: Scottorn Trailers Limited, Great Britain

[21] Appl. No.: 589,771

[22] Filed: Mar. 15, 1984

[30] Foreign Application Priority Data

Mar. 30, 1983 [GB] United Kingdom ............... 8308766

[51] Int. Cl.$^4$ .............................................. B60D 1/00
[52] U.S. Cl. ............................................... 280/478 B
[58] Field of Search ........... 280/478 R, 478 A, 478 B, 280/477, 434, 435, 436, 437, 438 R, 438 A, 439, 441, 423 R, 423 A, 423 B

[56] References Cited

U.S. PATENT DOCUMENTS

| 2,703,243 | 3/1955 | Clark | 280/477 |
|---|---|---|---|
| 3,378,280 | 4/1968 | Harms | 280/478 B |
| 3,612,576 | 10/1971 | Marler | 280/478 B |
| 3,820,822 | 6/1974 | Henderson | 280/478 A |
| 4,254,969 | 3/1981 | Martin | 280/478 B |
| 4,509,769 | 4/1985 | Weber | 280/491 R |

FOREIGN PATENT DOCUMENTS

| 961418 | 4/1957 | Fed. Rep. of Germany ... 280/478 R |
| 2941406 | 4/1981 | Fed. Rep. of Germany ... 280/478 A |
| 3229645 | 9/1984 | Fed. Rep. of Germany . |
| 1424211 | 11/1965 | France . |
| 2210952 | 7/1974 | France . |
| 699702 | 11/1953 | United Kingdom ........... 280/478 R |
| 1358016 | 6/1974 | United Kingdom . |
| 2086820 | 5/1982 | United Kingdom . |
| 2112756 | 7/1983 | United Kingdom . |

*Primary Examiner*—John J. Love
*Assistant Examiner*—Mitchell J. Hill
*Attorney, Agent, or Firm*—Lucas & Just

[57] ABSTRACT

This invention is concerned with the problem of coupling a heavy close-coupled four-wheeled trailer to a vehicle.

The coupling system provided includes a tubular member (1) pivotally mounted at the forward end of the trailer, and a draw-bar (4) slideable within the tubular member. A king pin (9) is provided on the rear end of the draw-bar (4) and, when the draw-bar is in its forwardmost position, the king pin can be locked in the jaws (10) of a fifth wheel coupling. If the coupling is released, the draw-bar can be moved rearwardly, and can also be moved laterally, within a range determined by cooperation of the king pin (9) with rails (12). The area through which the forward end of the draw-bar (4) can be moved is indicated by the hatched area (14) FIG. 3. When the draw-bar is moved to its rearwardmost position, it is again held on the fore-and-aft axis of the trailer by two further rails (13).

8 Claims, 6 Drawing Figures

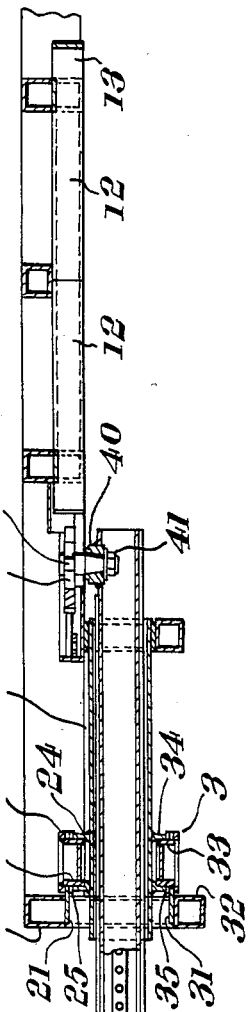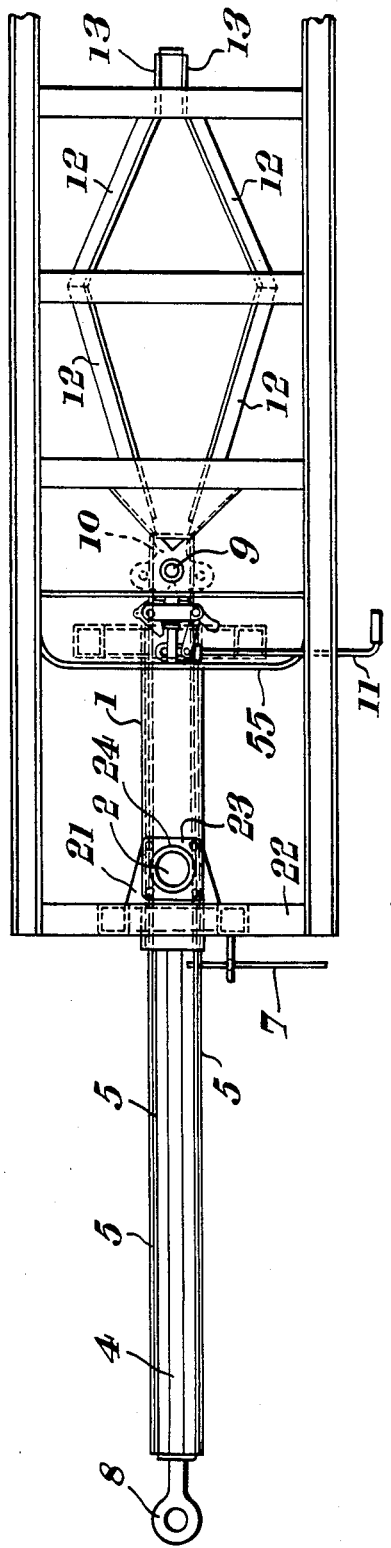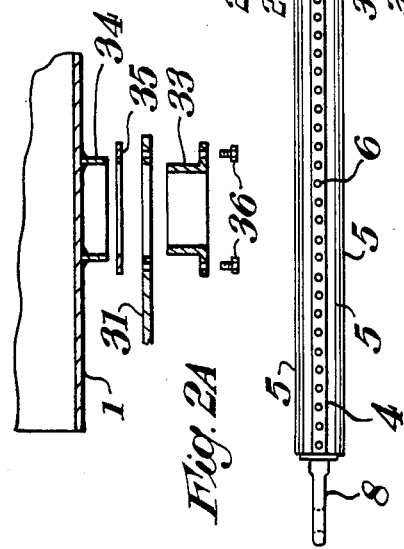

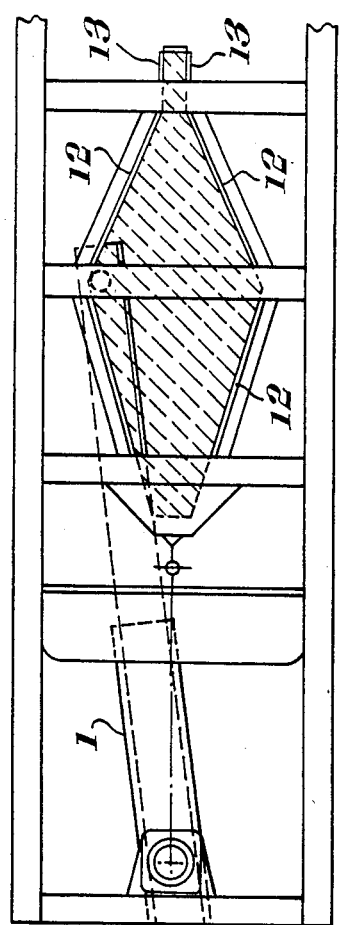
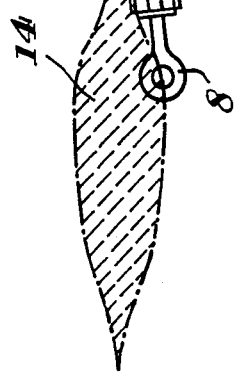
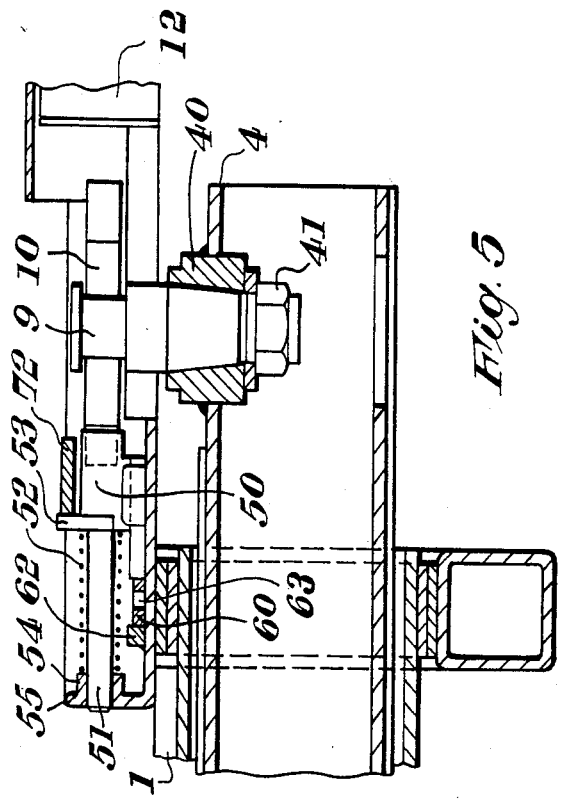
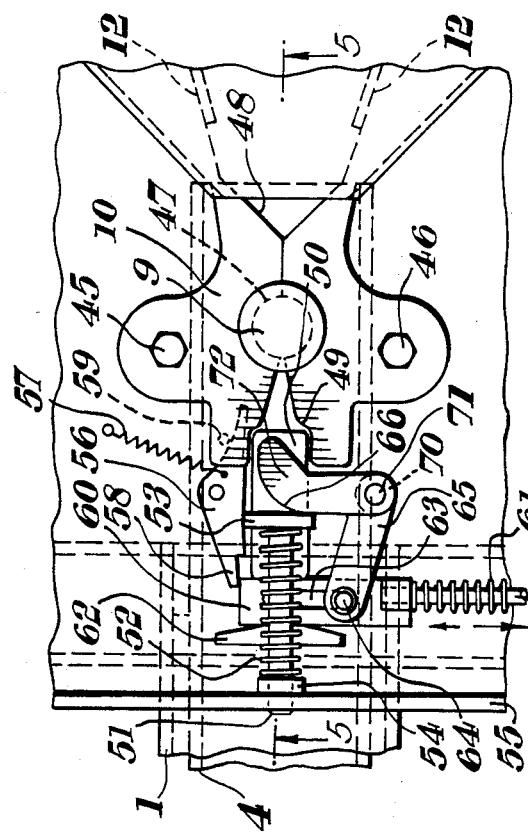

IMPROVEMENT IN OR RELATING TO TRAILERS

This invention relates to trailers and to coupling devices therefor. The invention is particularly, but not exclusively, applicable to close coupled trailers having four or more wheels, and to trailers designed to carry heavy loads.

The process of coupling a close coupled 4-wheeled trailer, and in particular a heavy close coupled 4-wheeled trailer, has always presented some difficulty. If the vehicle to be used for pulling the trailer is reversed towards the forward end of the trailer, it is almost impossible to align the vehicle hitch exactly with the coupling on the trailer drawbar. Accordingly it is normally necessary to manoeuvre the trailer at least through a small distance in order to align the coupling and the hitch. Providing the trailer is not too heavy this can be done, for example, by means of a jockey wheel which is lowered to the ground and used to support the drawbar. The jockey wheel is universally mounted so that the trailer can be moved laterally, at least through small angles, as well as being moved in a fore-and-aft direction. However, as soon as the weight of the trailer becomes excessive, this process ceases to be feasible. Accordingly it is an object of the prevent invention to provide an alternate method of coupling a trailer to a vehicle which can be used even when the trailer itself is too heavy to manoeuvre when it is not coupled to the vehicle.

From one aspect the invention consists in a trailer having a member pivotally mounted at the forward end thereof, a drawbar axially movable with respect to said member, and guide means adapted to hold said drawbar on the fore-and-aft axis of the trailer when it is in its forwardmost position relative to said member, and to allow the drawbar limited lateral movement about the pivot axis of said member when the drawbar is in a position to the rear of its forwardmost position.

Preferably the guide means are also adapted to hold the drawbar on the fore-and-aft axis of the trailer when it is in its rearwardmost position relative to the pivotally mounted member.

Preferably, manually releasable means are provided to lock the drawbar in its forwardmost position relative to the pivotally mounted member.

Preferably the pivotally mounted member is a tubular member and the drawbar is slidably mounted in said tubular member. Preferably the pivot axis of the pivotally mounted member is located in the vicinity of the front end of the trailer and is on the fore-and-aft axis of the trailer.

Preferably a king pin is upstanding from the rear end of the drawbar and, when the drawbar is in its forwardmost position, this king pin is locked in jaws mounted on the trailer chassis. These jaws lock automatically when the drawbar is pulled to its forwardmost position and can only be released by means of a manually-operated lever.

Preferably the king pin, when it is released from the jaws, is guided by means of rails dependent from the base of the trailer chassis. The rails are arranged so that over a certain range of rearward movement of the drawbar the lateral movement of the king pin relative to the chassis is permitted to increase, while over a second range of said rearward movement the permitted lateral movement of the king pin decreases until the rearwardmost position is reached when no further lateral movement is permitted.

It will be understood that, when a trailer in accordance with the invention is to be connected to the hitch of a towing vehicle, the drawbar is initially moved to a position to the rear of its forwardmost position, possibly to the position in which it is permitted maximum lateral movement. The towing vehicle is then manoeuvred so that the hitch connection is as near as is conveniently possible to the coupling on the drawbar. Thereafter the drawbar is pulled forward and if necessary moved laterally about the pivot axis of the pivotally-mounted member until the coupling and the hitch can be engaged. The towing vehicle is then moved forwardly under power and will pull the drawbar to its forwardmost position relative to the trailer. As it does so, the king pin will engage in the jaws, and the drawbar will be locked in its forwardmost position on the fore-and-aft axis of the trailer.

One particular use for a trailer in accordance with the present invention is in a system of the kind described in U.K. Patent Application No. 82 36313 (Publication No. 2 112 756A.) In that system the towing vehicle is provided with means for hoisting a load over the back of the vehicle and moving it forwardly along the vehicle chassis into a transport position. The same hoisting means can be used to move the load rearwardly along the vehicle chassis and to move it further rearwardly on to a trailer until it is in a transport position on the trailer.

It is to be understood that in such a system the forward end of the trailer should be as near as possible to the rear end of the towing vehicle when the load is to be transferred from the vehicle to the trailer and in addition the trailer and the vehicle must be aligned. Accordingly, when a trailer in accordance with the present invention is used in such a system, the king pin is unlocked from the jaws and the vehicle is reversed towards the trailer which is held stationary. As a result, the drawbar is moved rearwardly within the pivotally-mounted member and is guided so that when the drawbar reaches its rearwardmost position it is aligned with the fore-and-aft axis of the trailer.

From another aspect the invention consists in any features of novelty, taken singly or in combination, of the trailer coupling system illustrated in the accompanying diagrammatic drawings, in which:

FIG. 1 is a plan view of part of a trailer in accordance with the present invention;

FIG. 2 is a side view of the part illustrated in FIG. 1;

FIG. 2a is an enlarged exploded view of a part of the mechanism shown in FIG. 2;

FIG. 3 is a plan view showing the degree of movement permitted to the draw-bar;

FIG. 4 is an enlarged view of a part of FIG. 1; and

FIG. 5 is an enlarged view of part of FIG. 2 and is a side view of FIG. 4 taken along the line 5—5.

The coupling system illustrated includes a tubular member 1, preferably of square section, which is pivotally mounted on the trailer chassis by upper and lower mounting means 2 and 3. Each of these mounting means includes a plate 21(31) welded to a transverse chassis member 22(32). A flanged bush 23(33) is bolted to the respective plate and a tubular member 24(34), which is dimensioned to rotate on the respective bush, is welded to the tubular member 1. Thrust washers 25 and 35 are located between the respective plates 21 and 31 and the respective ends of the tubular members 24 and 34.

FIG. 2a is an enlarged exploded view of the lower mounting means 3 showing the tubular member 34 welded to the lower surface of the tubular member 1, the thrust washer 35, the plate 31, the flanged bush 33 and bolts 36.

Slideable within the tubular member 1 is a draw-bar 4. The draw-bar 4 is provided with four rails 5 which engage in corresponding channels in the member 1 to reduce friction between the draw-bar and the member. The draw-bar is provided with a number of holes 6 into which a rod 7 can be inserted to assist in manoeuvring the draw-bar. The draw-bar also includes a coupling 8, which may be of any well-known kind to suit the hitch on the vehicle with which the trailer is to be used.

On the rear end of the draw-bar 4 a king pin 9 is provided. This king pin may be generally similar to that used in the type of coupling usually referred to as a fifth wheel coupling. The king pin is secured by means of a nut 41 in a boss 40 welded to the upper side of the draw-bar. In the drawings the king pin 9 is shown locked in jaws 10, which again may be similar to the jaws of a fifth wheel coupling.

The underside of the coupling is shown on a larger scale in FIG. 4, and FIG. 5 is an enlarged side view of the coupling. It will be seen that, in addition to the jaws 10, the coupling includes pins 45 and 46 on which the jaws pivot. The jaws 10 have recesses which form a circular recess 47, in which the king pin 9 can be clamped when the jaws are closed. The forward ends of the jaws have diverging faces 48, which aid in the centering of the king pin during insertion. Rearwardly of the pivot pins 45 and 46 the jaws have cut-away faces 49, which form a recess for a locking plunger 50. The plunger 50 has an upstanding boss 53 attached to a rod 51 carrying a spring 52. The rod 51 is slideable in a bearing 54 attached to a cross member 55. The spring 52 urges the boss 53, and hence the plunger 50 towards the right in the drawings into the recess 49.

A pivotally mounted lever 56 is urged in an anticlockwise direction by a spring 57. The lever 56 has a cut-away portion 58 designed to engage the boss 53 if the plunger 50 has been moved rearwardly against the action of the spring 52. One of the jaws 10 is provided with a pin 59, which engages the end of the lever 56 opposite to the cut-away portion 58 to rotate the lever 56 in a clockwise direction when the jaws are opened.

A locking block 60 is mounted on a locking bar 11 carrying a spring 61. The block 60 is normally urged by the spring 61 in the direction to enter a space between the rear end of the locking plunger 50 and a fixed abutment 62. The locking block can, however, be moved out of this space by retraction of the locking bar 11 against the action of the spring 61. The locking block 60 is provided with a slot 63, which accommodates a pin 64 on a lever 65. The lever 65 is fixed to the lower end of a tubular member 70 rotatably mounted on a pivot pin 71. A further lever 72 is fixed to the upper end of the tubular member 70 so that the two levers 65 and 72 move together and effectively constitute a bell-crank lever. The lever 72 includes a curved portion 66 designed to engage the face of the boss 53 opposite to the shaft 51.

When the king pin 9 is to be inserted in the jaws 10, the locking bar 11 is retracted to move the locking block 60 out of the space between the locking plunger 50 and the fixed abutment 62. When the block is out of this space, the pin 64 will be located at the forward end of the slot 63 so that continuing movement of the locking bar 11 will rotate the levers 65 and 72 in an anticlockwise direction. As a result, the curved portion 66 of the lever 72 will apply a force to the boss 53 against the action of the spring 52. As a result, the locking plunger 50 will be moved leftwards in the drawings out of the recess 49. When the boss 53 reaches the cut-away portion 58 of the lever 56, the lever will be rotated anticlockwise by the spring 57, thus retaining the locking plunger 50 outside the recess 49.

If the draw-bar 4 is now moved forwardly, the king pin 9 will be guided towards the diverging faces 48 of the jaws 10. Continued movement of the draw-bar will urge the king pin against these faces, thus rotating the jaws 10 about the pivot points 45 and 46. This will allow the king pin to pass between the jaws and enter the circular recess 47. The opening movement of the jaws will cause the pin 59 to rotate the lever 56 in a clockwise direction against the action of the spring 57. Thus the cut-away portion 58 will clear boss 53 and allow the plunger 50 to move to the right of the drawings. However at this stage the plunger will not be able to enter the recess 49, since the rear faces of the jaws will have approached towards each other to close the entrance to the recess. However, as soon as the king pin 9 has entered the circular recess 47, the king pin will force the jaws towards the closed position, thus opening the entrance to the recess 49 and allowing the spring 52 to force the locking plunger 50 into the recess 49.

When the draw-bar 4 is to be moved rearwardly, the king pin 9 is unlocked from the jaws 10 by again retracting the locking bar 11. As already explained, this retraction removes the locking block 60 from the space between the locking plunger 50 and the fixed abutment 62, allowing the lever 72 to force the locking plunger to the left out of the recess 49. When the draw-bar 4 is pushed rearwardly, the king pin 9 rotates the jaws 10 towards the open position, allowing the king pin to pass out between the jaws.

Dependent below the trailer chassis is a guidance system formed by four rails 12. As can be seen, the two forward rails diverge from the fore-and-aft axis of the vehicle, whilst the two rearward rails converge towards the fore-and-aft axis. These rails define the limits through which the king pin 9 can be moved after being released from the jaws 10.

As the rear of the two rearward rails 12 are provided two further rails 13 which define a channel in which the king pin 9 is held on the fore-and-aft axis of the trailer.

As can be seen from FIG. 3, if the drawbar is moved rearwardly so that the king pin is located at the junction between the diverging and converging rails 12, the coupling 8 can be moved laterally through the greatest possible angle. Thus the area through which the coupling 8 can be moved is indicated by the hatched area 14 and this corresponds to the area through which the king pin 9 can be moved as indicated by the hatched area 15.

It is to be understood that the particular shape of the area 15 is only given by way of example, and it may be preferred that the four rails 12 should be replaced by two curved rails forming, for example, a generally elliptical area.

It is to be understood that a trailer in accordance with the invention can be connected to a towing vehicle without the necessity for moving the trailer in any direction. Further, the drawbar is automatically aligned when it is pulled into its forwardmost position or pushed into its rearwardmost position by the towing vehicle.

When a trailer as described is to be connected to a towing vehicle, the rod 7 is inserted in one of the holes 6 in the draw-bar 4. The fifth wheel coupling is released by means of the locking bar 11 and the draw-bar is moved rearwardly by means of the rod 7 until the kin pin 9 is located approximately on the line of the junctions between the forward and rearward rails 12. Thereafter the towing vehicle is manoeuvred so that the hitch connection is as near as is conveniently possible to the coupling 8. The draw-bar is then moved laterally and forwardly or rearwardly as required to engage the coupling and the hitch. The towing vehicle is then moved forwardly under power and will pull the draw-bar forward until the king pin 9 is guided into the jaws 10 and locked in position.

If a load is to be transferred from the towing vehicle to the trailer, as hereinbefore described, the locking bar 11 is again released and the vehicle is reversed towards the trailer, causing the king pin 9 to pass between, and if necessary be guided by, the rails 12 until it enters the channel between the rails 13.

I claim:

1. A trailer having a member pivotally mounted about a pivot axis at the forward end thereof, a draw-bar by which the trailer is adapted to be drawn when coupled to a vehicle and which is axially movable with respect to said member, guide means adapted to hold said draw-bar on the fore-and-aft axis of the trailer when said draw-bar is in its forwardmost position relative to said member, and to allow the draw-bar limited lateral movement about the pivot axis of said member when the draw-bar is in a position to the rear of its forwardmost position, and manually releasable means to lock the draw-bar in its forwardmost position relative to the pivotally-mounted member.

2. A trailer as claimed in claim 1, wherein the guide means are adapted to hold the draw-bar on the fore-and-aft axis of the trailer when said draw-bar is in its rearwardmost position relative to the pivotally-mounted member.

3. A trailer as claimed in claim 1, wherein the pivotally-mounted member is a tubular member and the draw-bar is slideably mounted in said tubular member.

4. A trailer as claimed in claim 1, wherein the pivot axis of the pivotally-mounted member is located in the vicinity of the front end of the trailer and is on the fore-and-aft axis of the trailer.

5. A trailer as claimed in claim 1, including a king pin upstanding from the rear end of the draw-bar and jaws mounted on the trailer chassis, said jaws being adapted to lock the king pin between said jaws when the draw-bar is in the forwardmost position.

6. A trailer as claimed in claim 5, wherein the jaws lock automatically when the draw-bar is pulled to the forwardmost position and can only be released by means of a manually-operated lever.

7. A trailer as claimed in claim 5, including rails dependent from the base of the trailer chassis to guide the king pin when said king pin is released from the jaws.

8. A trailer as claimed in claim 7, wherein the rails are arranged so that, over a first range of rearward movement of the draw-bar, the lateral movement of the king pin relative to the chassis is permitted to increase, while over a second range of said rearward movement the permitted lateral movement of the king pin decreases until the rearwardmost position is reached, when no further lateral movement is permitted.

* * * * *